United States Patent
Martina

[15] 3,688,118
[45] Aug. 29, 1972

[54] SELECTIVE NEUTRON SENSOR

[72] Inventor: Eugene F. Martina, Los Angeles, Calif.

[73] Assignee: The United States of America as represented by the Secretary of the Air Force

[22] Filed: Feb. 25, 1970

[21] Appl. No.: 14,123

[52] U.S. Cl. ............................. 250/83.1, 250/83.6 R
[51] Int. Cl. ................................................ G01t 3/00
[58] Field of Search ............ 250/83.1, 83.6 R; 313/61

[56] References Cited

UNITED STATES PATENTS 3,238,369   3/1966   Kronenberg .............. 250/83.1
3,102,198   8/1963   Bonner ..................... 250/83.1

Primary Examiner—James W. Lawrence
Assistant Examiner—Davis L. Willis
Attorney—Harry A. Herbert, Jr. and George Fine

[57] ABSTRACT

A selective neutron sensor apparatus for selectively detecting a burst of neutrons in a space ionizing radiation environment containing various energetic charged particles utilizing two substantially similar detectors. One of the detectors is sensitive to both charged particles and neutrons while the other is sensitive to charged particles only. A differencing circuit receiving the outputs from the two detectors provides an output which represents the true neutron count.

6 Claims, 1 Drawing Figure

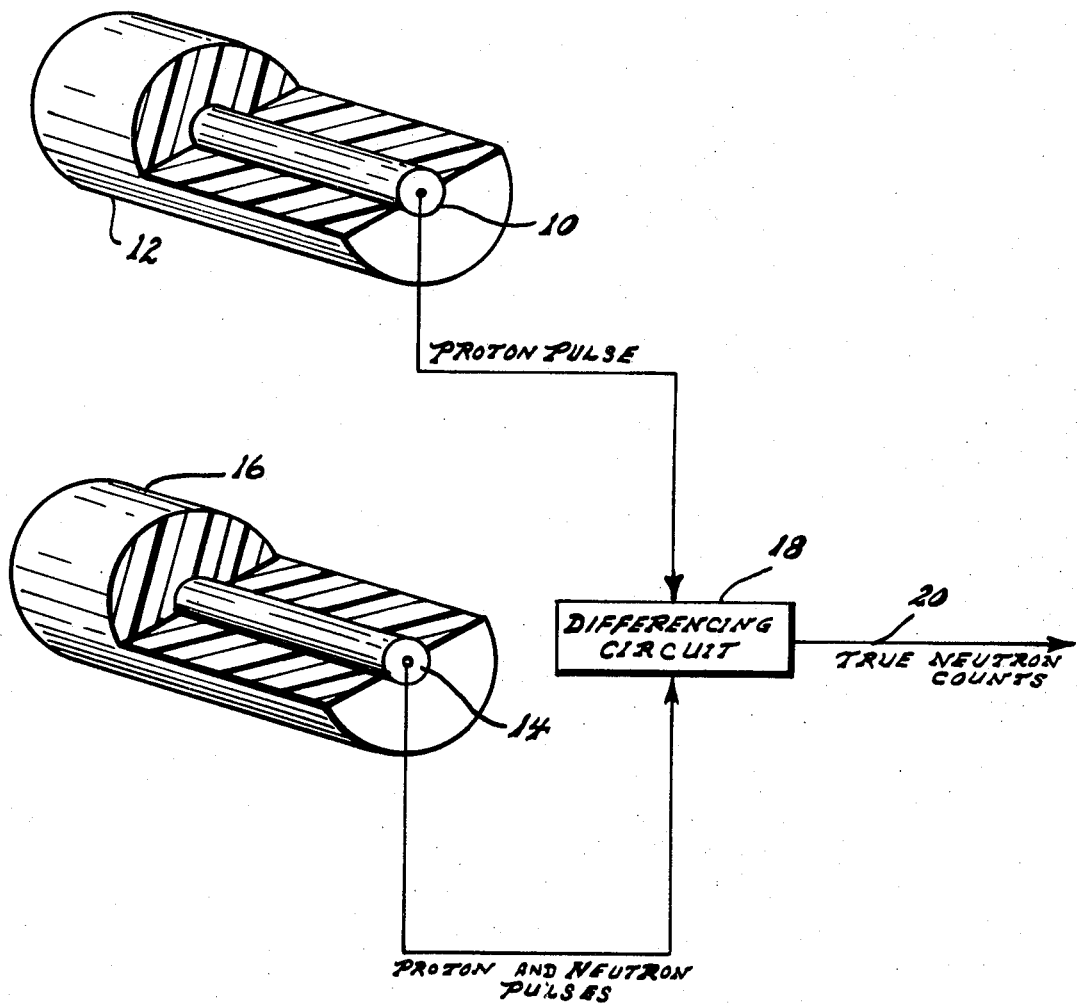

SELECTIVE NEUTRON SENSOR

BACKGROUND OF THE INVENTION

The present invention relates broadly to a selective neutron sensor and in particular to an improved highly selective neutron detector means for determining accurately the neutron level in a given radiation environment.

In the prior art, various methods and means have been employed to detect and determine the neutron level in a radiation environment. For example, if one were attempting to monitor possible violations of the Test Ban Treaty occurring in space he would use satellite borne instrumentation as is done in the U.S. Vela Satellite Program. One of the observables from a space nuclear detonation is the burst of neutrons. If the interested party therefore flew a neutron sensor and observed a sudden increase in its output, evidence of a violation would be obtained. However, recent measurements of the space radiation environment have shown that the sun periodically emits large numbers of energetic protons. They occur in bursts whose time signature sometimes resembles the neutron time signature which would be expected from a weapon detonated in space. As a consequence, if one flies a neutron sensor which also responds to solar protons there is the possibility of obtaining ambiguous evidence.

In the particular application of the detection of neutrons in space, trapped particles, solar protons, and galactic cosmic rays can be mistaken for neutrons by a detector. In the case of He-3 neutron proportional counters where the energy released by the reaction $He^3(n,p)H^3$ is 0.76 mev, any charged particle which deposits 0.76 mev of energy or an amount greater than the voltage threshold set on the read-out electronics will be indistinguishable from a neutron. For example, an energetic proton passing through a diameter of a typical He-3 counter filled to six atmospheres pressure can deposit up to 2 mev. The prior art method of determining the charged particle background is to measure this level directly with charged particle detectors. This method is not very accurate since the charge particle effect on the neutron detector must be inferred from the results of the charged particle detectors.

SUMMARY OF THE INVENTION

The present invention utilizes a pair of substantially identical detectors whose outputs are compared in a differencing apparatus to yield the true neutron count in a given samples space radiation environment. The two detectors are essentially identical in all respects in that their size, configuration and orientation are the same, except that one of the detectors is sensitive to both charged particles and neutrons and the other detector is sensitive only to charged particles and completely insensitive to neutrons. This is accomplished by utilizing helium having an atomic weight of three as the reactant in one detector and in the other detector utilizing as the reactant helium having an atomic weight of four.

It is one object of the invention, therefore, to provide an improved selective neutron detector apparatus having the capability of detecting neutrons in a space environment containing trapped particles, solar protons and galactic cosmic rays.

It is another object of the invention to provide an improved selective neutron detector apparatus to distinguish neutrons from charged particles and to provide an accurate count of the detected neutron level.

These and other advantages, features and objects of the invention will become more apparent from the following description taken in connection with the illustrative embodiment in the accompanying drawing, wherein the FIGURE is a pictorial representation of the selective neutron sensor apparatus in accordance with this invention.

DESCRIPTION OF PREFERRED EMBODIMENT

Referring now to the FIGURE, there is shown a selective neutron sensor apparatus for determining the true neutron count in a given space radiation environment. Proportional counter 10 which is encased in moderator 12 provides an output pulse in response to proton impingement to differencing circuit 18. Proportional counter 14 which is encased in moderator 16 provides an output in response to both proton and neutron impingement to differencing circuit 18. The two proportional counters 10, 14 are substantially identical in every respect, i.e., size, configuration, orientation, etc. The main difference between the two counters is that counter 14 is sensitive to both charged particles and neutrons while the counter 10 is sensitive to only charged particles and totally insensitive to neutrons. This effect is achieved by having the counter 14 filled with helium having an atomic weight of three (He-3) and having the counter 10 filled with helium having an atomic weight of four (He-4). The differencing circuit 18 electrically subtracts the proton pulses from proportional counter 10 from the proton and neutron pulses of proportional counter 14. The result is that only neutron pulses remain at the output 20 of the differencing circuit 18. The output 20 may be fed to an electronic readout device, such as a counter to provide an accurate count of only the neutrons present in a particular space radiation environment.

The proportional counters 10, 14 are conventional devices of the type as are described in the textbook entitled, "Nuclear Radiation Detection," written by William J. Price, the second edition of which was published by McGraw-Hill, Inc. in 1964, in Chapter 6, entitled, "Proportional Counters," pages 144–158. The two proportional counters 10, 14 are mounted together in substantially the same orientation in standard moderators 12, 16. The counters 10, 14 are identical in all aspects except that one is filled with He-3 (helium gas with an atomic weight of three) and the other is filled with He-4 (helium gas with an atomic weight of four). The reaction cross section for thermal neutrons in He-3 is several thousand barns and while that for He-4 is forbidden (endothermic); therefore, only the He-3 counter 14 will respond to neutrons. On the other hand, the stopping power for charged particles is nearly identical in both counters and therefore the count rates of the counters in the presence of neutrons and charged particles will differ only by the intensity of neutrons.

Proportional counters are most useful and valuable for the detection of various types of radiation which yield small amounts of ionization, for example, in this category besides neutrons, X-rays and low-energy electrons may be included. By making use of gas amplification (as is the case with the use of proportional counters) it has been shown possible to obtain a standard deviation of only 1 percent in pulses due to 100 keV electrons, corresponding to a full line width at half maximum of only 2.5 keV.

Neutron-induced reactions in which protons, alpha particles or fission fragments are emitted. In certain light nuclei an $(n, p)$ or $(n, \alpha)$ reaction may be accompanied by a considerable energy release, Q. The reaction products then consist of two fast ions with a total kinetic energy equal to the incident neutron energy together with the energy release, Q. The linear relation between the total kinetic energy and the neutron energy is important for fast neutron detection. Reactions commonly applied to this are:

$B^{10}(n,\alpha) Li^7, Q = 2.78$ MeV
$Li^6(n,\alpha) H^3, Q = 4.77$ MeV
$He^3(n,p) H^3, Q = 0.76$ MeV where $Q$ represents the energy release.

Certain fission processes are induced only by neutrons which exceed a certain energy threshold so that a detector based on such a reaction can be made sensitive only to fast neutrons. Thus, $Np^{237}$ has a fission threshold of 0.75 MeV. Therefore, in an application utilizing an He-3 neutron proportional counter where the energy released by the reaction $He^3(n,p)H^3$ is 0.76 mev, any charged particle which deposits 0.76 mev of energy or an amount greater than the voltage threshold set on the read-out electronics will be indistinguishable from a neutron. Thus, an energetic proton passing through a diameter of a typical He-3 counter filled to 6 atmospheres pressure can deposit up to 2 mev. Accordingly, by using a He-3 proportion counter 14 in conjunction with a He-4 proportional counter 10 and processing the outputs from both counters in a differencing circuit 18, the true neutron counts may be extracted with precision from the background radiation.

The moderators 12, 16 shown in the FIGURE in partial section, are utilized to slow down the neutrons and the other radiation particles which are present in the sampled space environment. When neutrons are epithermal or fast, they are slowed down or thermalized by scattering processes. These scattering processes may be either the elastic or inelastic type. In a large system in which the cross sections for the scattering processes are large compared with those for absorption processes, a large fraction of the neutrons are slowed down to thermal equilibrium with the system before eventual absorption. A medium which is employed for slowing down neutrons is called a moderator. For moderation by elastic collision, materials with small mass numbers are most effective, since these can absorb the largest fraction of the neutron energy per collision. Materials which contain a large amount of hydrogen make good moderators; water and paraffin are noteworthy examples. In addition, heavy water, beryllium, and carbon are very good moderators since they have reasonably low mass numbers and very low absorption cross sections.

While in accordance with the provisions of the statutes, we have illustrated and described the best forms of the invention now known to us, it will be apparent to those skilled in the art that changes may be made in the form of the apparatus disclosed without departing from the spirit of the invention as set forth in the appended claims, and that in some cases certain features of the invention may be used to advantage without a corresponding use of other features.

I claim:

1. An apparatus for selectively detecting neutrons in a space radiation environment comprising in combination:

A first proportional counter sensitive only to proton radiation, said first proportional counter having output pulses representative of said proton radiation;

A second proportional counter sensitive to proton and neutron radiation, said second proportional counter having output pulses representative of said proton and neutron pulses;

A differencing circuit receiving said output pulses of said first proportional counter and receiving said output pulses of said second proportional counter, said differencing circuit subtracting said output pulses of said first proportional counter from said output pulses of said second proportional counter and providing output pulses, indicative of the true neutron count.

2. An apparatus for selectively detecting neutrons as described in claim 1 wherein said first proportional counter is filled with helium gas having an atomic weight of four.

3. An apparatus for selectively detecting neutrons as described in claim 1 wherein said second proportional counter is filled with helium gas having an atomic weight of three.

4. An apparatus for selectively detecting neutrons as described in claim 1 further including a first moderator encasing said first proportional counter and a second moderator encasing said second proportional counter.

5. An apparatus for selectively detecting neutrons as described in claim 4 wherein said first and second moderators are paraffin wax.

6. An apparatus for selectively detecting neutrons as described in claim 4 wherein said first and second moderators are carbon.

* * * * *